Patented June 26, 1934

1,964,039

UNITED STATES PATENT OFFICE 1,964,039

METHOD OF PROTECTING CELLULOSE DERIVATIVE SURFACES AND PRODUCT THEREOF

Camille Dreyfus, New York, N. Y.

No Drawing. Original application August 7, 1928, Serial No. 298,139. Divided and this application May 4, 1932, Serial No. 609,330

9 Claims. (Cl. 91—68)

This application is a division of my application Serial No. 298,139, filed on or about August 7, 1928.

This invention relates to the protection of surfaces of materials containing derivatives of cellulose, and particularly cellulose esters, against the action of acids, alkalis or other deleterious agents.

An object of my invention is to apply to surfaces containing derivatives of cellulose, a film of a material that is resistant to the action of acids, alkalis or other destructive agencies.

Another object of my invention is to coat surfaces containing derivatives of cellulose, with a film containing synthetic resin of the phenol-furfural or related type.

Other objects of my invention will appear in the following detailed description.

Articles that are coated with or that contain derivatives of cellulose are in wide use. However, the surfaces of these articles often become marred, due to the action of fruit acids or other acids, alkalis, heat and the like. I have found that if such articles are coated with a film containing synthetic resins, their surfaces are protected against the harmful action of these agents.

In accordance with my invention, articles which are made of, or have their surfaces coated with, materials containing derivatives of cellulose, are coated with a coating composition containing synthetic resin that forms films that adhere to such surfaces, and which are resistant to fruit acids, other acids, alkalis, heat and the like. The coating composition may be applied in any suitable manner, such as by brushing, spraying or dipping.

The articles to be coated may be any articles of commerce, which either contain, or are coated with, a material containing derivatives of cellulose. Examples of such articles are celluloid like articles of commerce, such as toilet articles, fountain pens, blocks, sheets, films (photographic or other films), and the like. Also veneers, which are sheets containing derivatives of cellulose that are applied to furniture, walls of buildings, containers or wood boards, may be coated in accordance with my invention, either prior to their being applied to the article, or after they had been applied. This invention also contemplates the coating of films containing derivatives of cellulose on various articles formed by coating articles, such as automobiles, furniture, walls, etc. with lacquers containing derivatives of cellulose.

The derivatives of cellulose in the surfaces of the material to be coated may be any of the derivatives commonly used for this purpose, such as cellulose nitrate or organic derivatives of cellulose.

Examples of organic derivatives of cellulose are organic esters, such as cellulose acetate, cellulose formate, cellulose propionate, cellulose butyrate, and cellulose ethers, such as methyl cellulose, ethyl cellulose and benzyl cellulose.

The resin to be employed in the coating composition, should be of the type that is soluble in organic solvents, so that solutions thereof may be made. Any suitable solvent may be employed in making the solution, examples of which are benzene and acetone. The coating composition may also contain, if desired, pigments and/or dyes or other effect materials, and may also contain other resins or gums. If desired, medium and/or high boiling solvents may also be employed in making up the coating composition. Softeners or plastifiers such as diethyl phthalate, dibutyl phthalate or diethyl tartrate, may also be added to the coating composition if desired.

Any suitable fusible and soluble synthetic resin that is resistant to the action of acids, alkalis, etc. may be employed. Examples of such resins which have been found to give excellent results are the various furfural resins, such as phenol-furfural and aniline-furfural. It is to be understood that the term "phenol", as used here, includes bodies other than simple phenols, such as cresols and the like. Any one or a mixture of two or more of these resins, may be employed for making the coating composition.

It is advantageous to employ synthetic resins that approach as near as possible to the insoluble and infusible state. Appropriate catalysts may be added to the coating composition to promote further condensation of the resins after it has been applied as a film to the articles so that subsequently they become infusible and insoluble. This further condensation to an infusible type may be obtained by baking, exposure to sunlight or ultra-violet light or otherwise.

The coating composition containing the synthetic resins may be made of any desired concentration to suit the requirements of the operator. Generally, I have found that one part of the synthetic resin dissolved in 8 to 12 parts of a volatile solvent, produces satisfactory results.

It is to be understood that the foregoing detailed description is given merely by way of an illustration, that any variations may be made therein without departing from the spirit of this invention.

The term "surfaces" as used in the appended claims is intended to include surfaces of celluloidlike articles of commerce such as toilet articles, films, sheets, blocks and the like but not textile materials.

Having described my invention, what I claim and desire to secure by Letters Patent is:

1. Method of protecting surfaces containing derivatives of cellulose against deleterious agencies comprising applying thereto a film containing a phenol-furfural resin and then converting said resin into an infusible and insoluble state.

2. Method of protecting surfaces containing esters of cellulose against deleterious agencies comprising applying thereto a film containing a phenol-furfural resin and then converting said resin into an infusible and insoluble state.

3. Method of protecting surfaces containing cellulose acetate against deleterious agencies comprising applying thereto a film containing a phenol-furfural resin and then converting said resin into an infusible and insoluble state.

4. Method of protecting surfaces containing derivatives of cellulose against deleterious agencies which comprises applying thereto a film containing a phenol-furfural resin and a catalyst operative subsequently to promote the passage of said resin into an infusible and insoluble state.

5. Method of protecting surfaces containing esters of cellulose against deleterious agencies which comprises applying thereto a film containing a phenol-furfural resin and a catalyst operative subsequently to promote the passage of said resin into an infusible and insoluble state.

6. Method of protecting surfaces containing cellulose acetate against deleterious agencies which comprises applying thereto a film containing a phenol-furfural resin and a catalyst operative subsequently to promote the passage of said resin into an infusible and insoluble state.

7. Articles having surfaces containing derivatives of cellulose having thereon a film containing an insoluble and infusible phenol-furfural resin.

8. Articles having surfaces containing cellulose esters having thereon a film containing an insoluble and infusible phenol-furfural resin.

9. Articles having surfaces containing cellulose acetate having thereon a film containing an insoluble and infusible phenol-furfural resin.

CAMILLE DREYFUS.